B. B. BOWER, Sr. & G. G. BOWER.
ROTARY ENGINE.
APPLICATION FILED SEPT. 29, 1908.
906,684.
Patented Dec. 15, 1908.
5 SHEETS—SHEET 3.
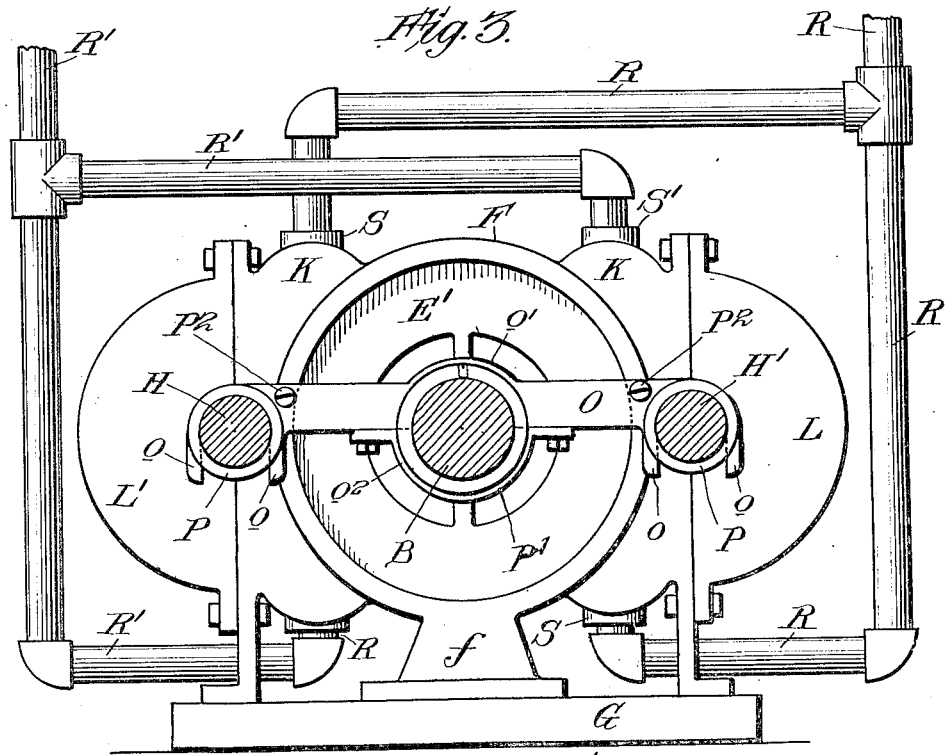
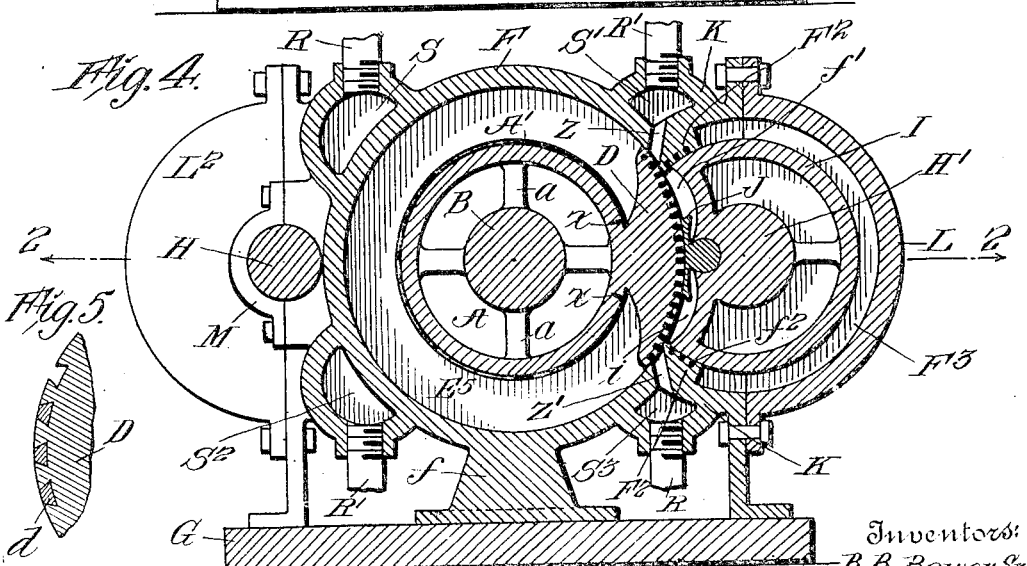

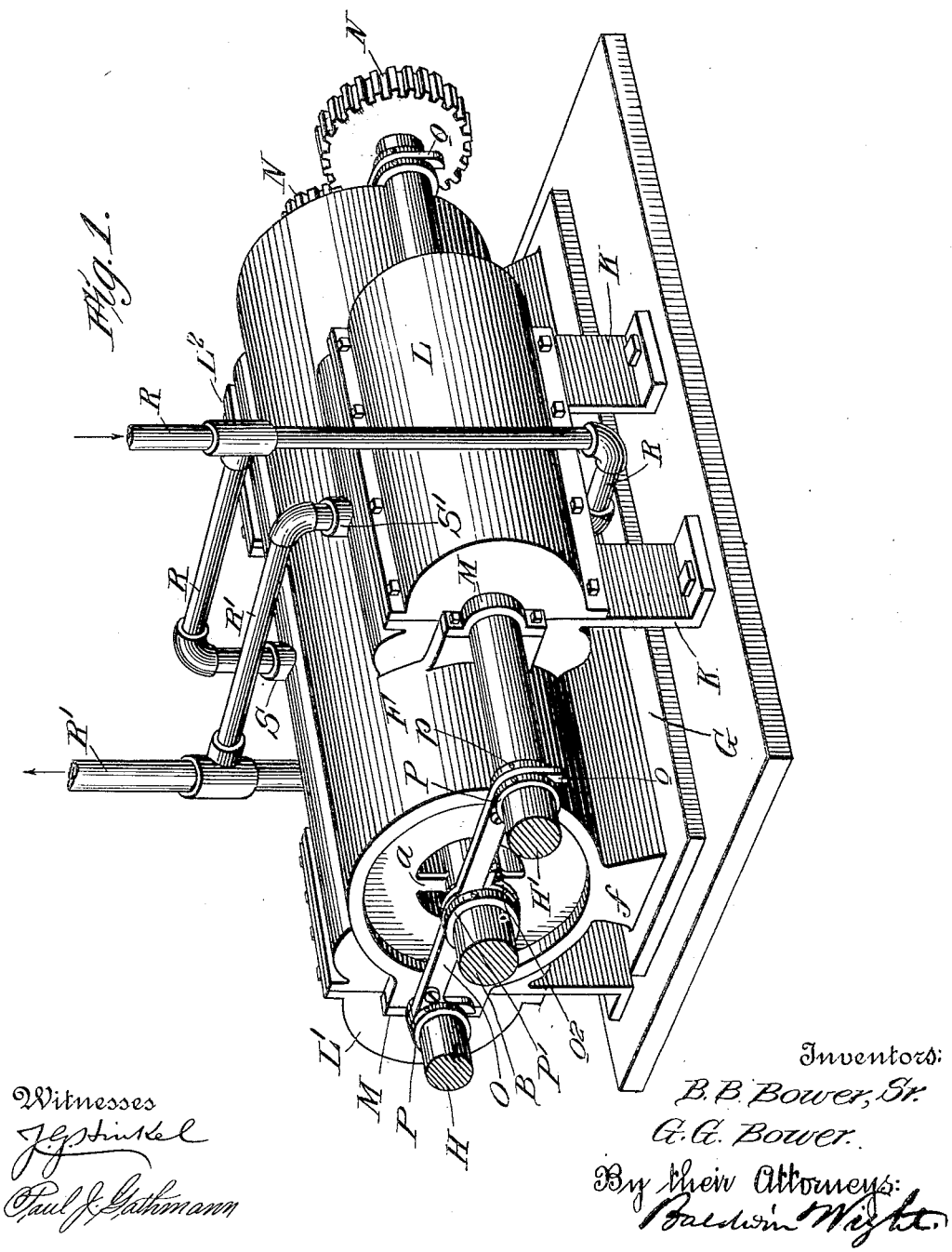

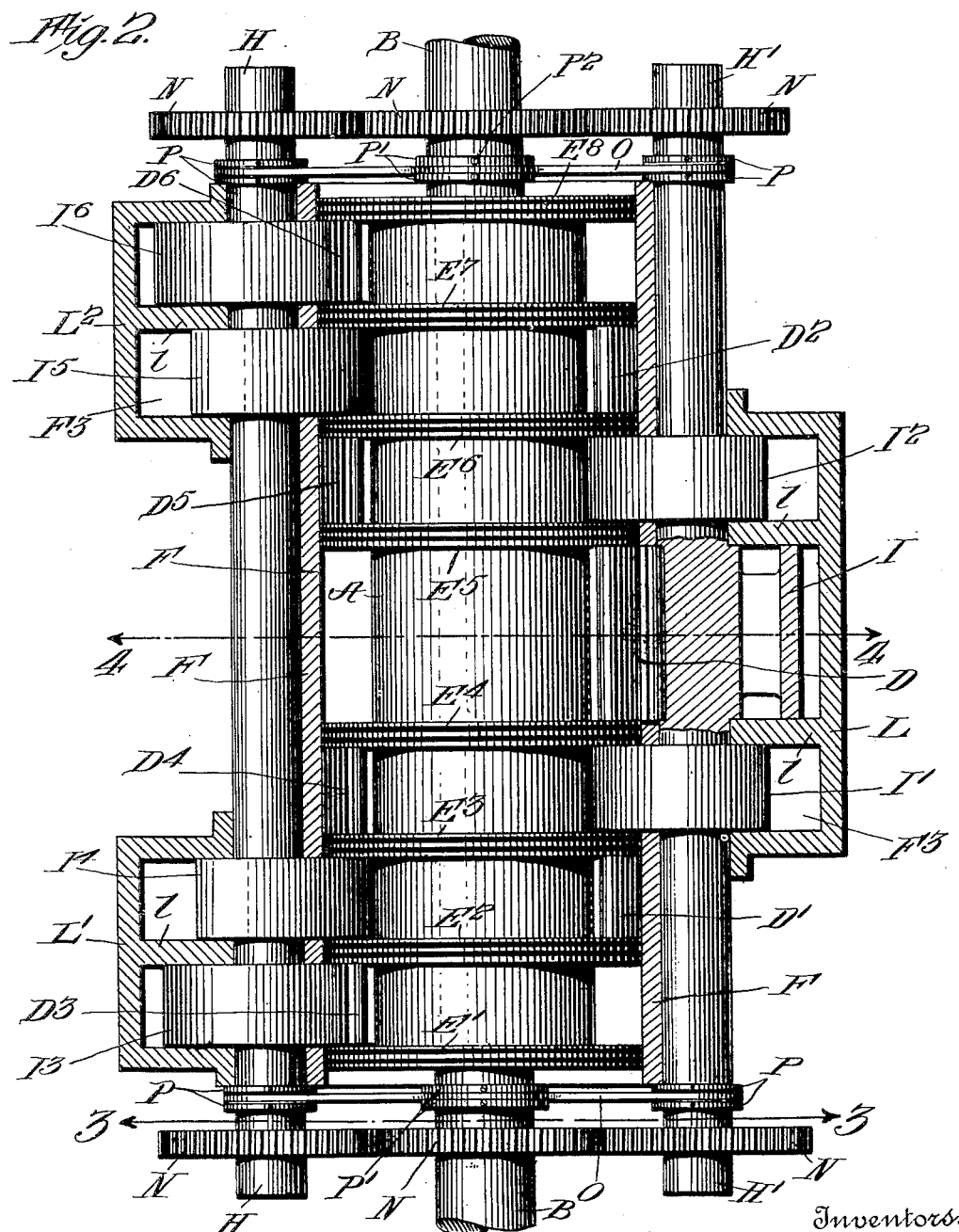

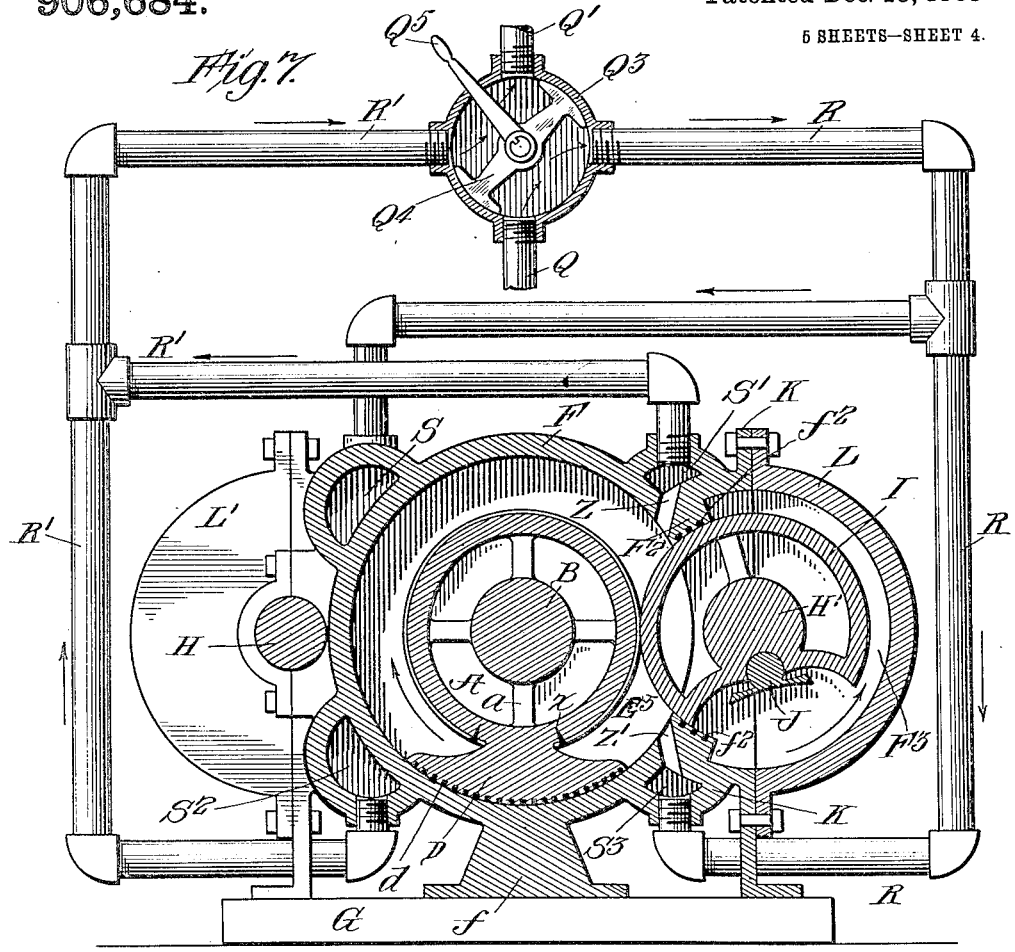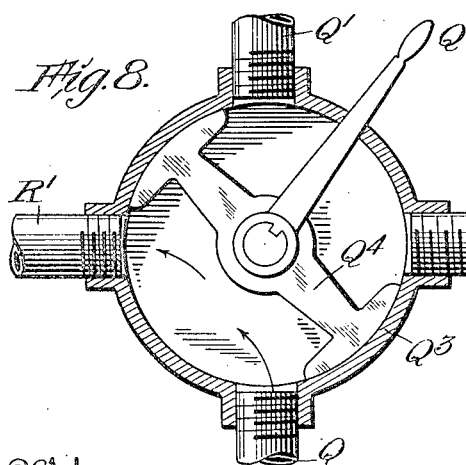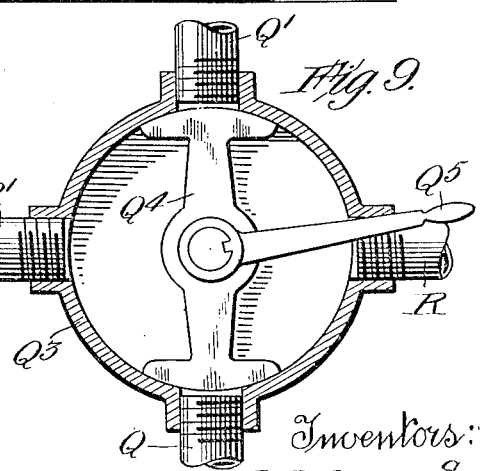

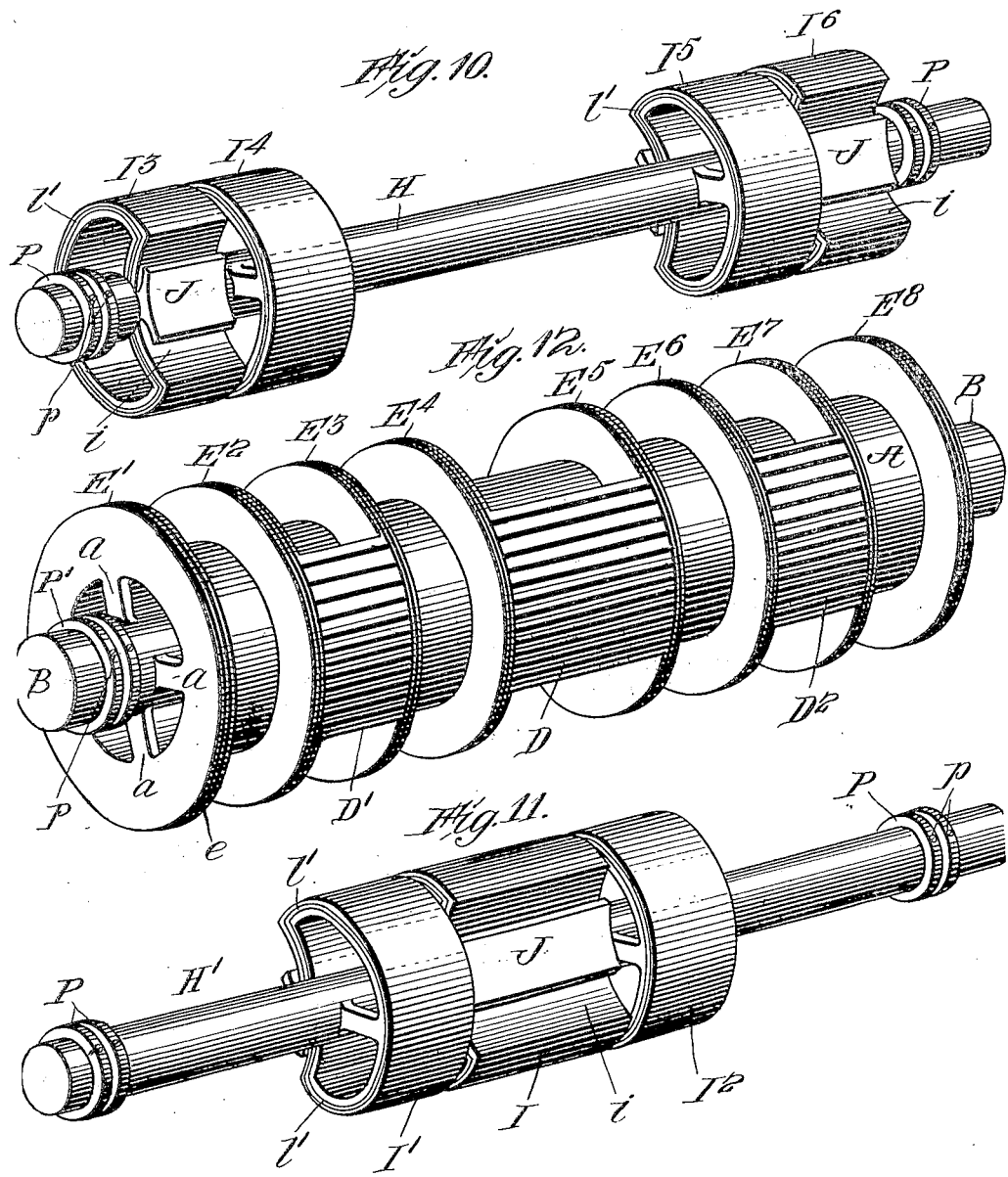

UNITED STATES PATENT OFFICE.

BYRON B. BOWER, SR., AND GEORGE GORDON BOWER, OF BAINBRIDGE, GEORGIA.

ROTARY ENGINE.

No. 906,684.      Specification of Letters Patent.      Patented Dec. 15, 1908.

Application filed September 29, 1908. Serial No. 455,232.

*To all whom it may concern:*

Be it known that we, BYRON B. BOWER, Sr., and GEORGE G. BOWER, citizens of the United States, residing in Bainbridge, in the county of Decatur and State of Georgia, have invented certain new and useful Improvements in Rotary Engines, of which the following is a specification.

Our invention relates to rotary engines of the class known as multiple cylinder engines, *i. e.*, those in which a plurality of pistons are employed, operating in a corresponding number of "cylinders" or chambers, and the objects of our invention are to eliminate in this class of engines all reciprocating movement of the operating parts and to secure perfect gravity or centrifugal balance and perfect steam balance, all dead centers being avoided in order that the mechanism may operate freely and evenly without undue strain or unequal wear.

Our improved rotary engine is especially designed to be operated by steam and will herein be described as so operated, but it will be understood that we contemplate using other motive fluid or force also.

In carrying out our invention, we employ a main driving-shaft on which is mounted a horizontally arranged hollow cylinder, open at opposite ends and held a suitable distance from the shaft by appropriate supports which permit a free passage of air or other cooling medium through the cylinder, when the cooling thereof is desirable. On the periphery of this cylinder is mounted a series of rings or flanges, preferably, eight, all of equal diameter, equal width, and suitably spaced to accommodate the several pistons and rotary abutments arranged on opposite sides thereof.

The pistons are rigidly secured to the cylinder between the rings or flanges and such pistons and flanges are inclosed by a cylindrical casing which closely fits the peripheries of the pistons and flanges, while permitting the same to freely rotate. The rings or flanges serve to divide the space between the piston cylinder and its casing into a series of piston chambers, each of which is separated from all the others and acts independently thereof.

We preferably employ seven pistons, six of which are of the same shape, size and weight and one double the size and weight of each of the others. The large piston and two of the others are arranged on one side of the cylinder, while the other four pistons are disposed on the opposite side thereof, thus providing a perfect balance as regards gravity and centrifugal force, and also a perfect steam balance and avoiding dead centers, as will more fully appear later on in this specification.

On each side of the piston-carrying-cylinder is mounted a shaft, carrying an appropriate number of rotary abutments placed opposite the pistons with which they coöperate and each of which is recessed to at the proper time receive its piston as the latter passes it and within each such recess is preferably arranged a loosely mounted bearing piece or shoe for insuring a steam-tight connection between the piston and abutment when said piston is in the recess of the abutment. The rotary abutments are mounted in housings or casings which open into the casing of the piston-carrying-cylinder and have steam spaces surrounding the rear portions of the abutments in order that the steam pressure on said abutments may be equally distributed.

No valves are employed in our engine, the admission and exhaust ports being suitably opened and closed by the pistons as they rotate past said ports. The engine may be easily reversed by changing the exhaust ports to serve as admission ports and using the admission ports for exhaust. Suitable valve mechanism is employed for this purpose.

The engine is so constructed that parts of the housing of the rotary abutments may be readily removed to permit said abutments to be easily withdrawn while the piston-carrying-cylinder with its pistons and flanges may be readily withdrawn endwise from its casing. The parts may also be quickly assembled by this construction. The shafts of the piston-carrying-cylinder and the rotary abutments are geared to rotate simultaneously and at precisely the same speed and means are provided for holding the gearing in such relation as to insure the necessary accurate operation.

In the accompanying drawings, Figure 1 is a perspective view of a rotary engine embodying our improvements. Fig. 2 shows a horizontal section thereof on the line 2—2 of Fig. 4. Fig. 3 shows a transverse section on the line 3—3 of Fig. 2. Fig. 4 shows a transverse section on the line 4—4 of Fig. 2. Fig. 5 is a detail view of one of the pistons showing how the steam packing-bars are preferably arranged therein. Fig. 6 is a detail view showing that the admission and exhaust ports are equal in width to the pistons. Fig. 7 is a view similar to Fig. 4 with parts in a different position and this figure also shows the pipe connections and the valve mechanism for controlling the admission and exhaust and for reversing the engine when desired. Fig. 8 is a view of the valve mechanism showing the valve in a different position from that shown in Fig. 7. Fig. 9 is a similar view of the valve mechanism with the valve set to shut off or throttle the admission of steam from the boiler to the pipe system. Fig. 10 is a perspective view of one set of rotary abutments. Fig. 11 is a perspective view of the other set of rotary abutments. Fig. 12 is a perspective view of the piston-carrying-cylinder and its pistons and flanges.

The piston-carrying cylinder A is mounted on what we call the main driving-shaft B, as this shaft should be connected with the mechanism to be operated. As shown in Fig. 4, the cylinder A is of larger diameter than the shaft B and is held in place thereon by suitable supports or arms $a$ of equal length, causing the periphery of the cylinder to be equally disposed at all points from the axis of the shaft. The cylinder A carries a plurality of pistons, preferably seven, there being a piston of comparatively large diameter D (see Fig. 12), disposed midway between the ends of the cylinder A, two smaller pistons $D'$, $D^2$, on opposite sides thereof on the same side of the cylinder A and four pistons, $D^3$, $D^4$, $D^5$, $D^6$, of the same size as the pistons $D'$, $D^2$, on the diametrically opposite side of the cylinder A (see Fig. 2). Two of these pistons are near one end of the cylinder A and the other two are near the opposite end thereof.

Each piston $D'$, $D^2$, $D^3$, $D^4$, $D^5$, $D^6$, is of the same general shape as the piston D, having its periphery of the same length but being of precisely half the width and half the weight of the piston D. By this arrangement half the weight of the pistons is carried on one side of the shaft and half on the other side thereof, thus providing perfect gravity and centrifugal balance and as the motive fluid operates on opposite sides of the cylinder, a perfect balance of pressure is insured.

The cylinder A is provided with a series of rings or flanges $E'$, $E^2$, $E^3$, $E^4$, $E^5$, $E^6$, $E^7$, $E^8$, which may be formed thereon or rigidly attached thereto in any suitable way. They are all of the same diameter and thickness and they serve to separate the pistons from each other and to provide separate chambers for the several pistons. The peripheries of the flanges coincide with the peripheries of the pistons and they are adapted to move in close contact with the inner surface of the casing or housing F. The middle piston D is arranged between the two middle flanges $E^4$, $E^5$. The pistons $D'$ and $D^2$ are arranged between the flanges $E^2$, $E^3$ and $E^6$, $E^7$, respectively, while the pistons $D^3$, $D^4$, $D^5$ and $D^6$, not shown in Fig. 12, are arranged respectively between the flanges $E'$, $E^2$; $E^3$, $E^4$; $E^5$, $E^6$; $E^7$, $E^8$.

It will be observed that the two middle flanges $E^4$, $E^5$ are twice as far apart as each pair of the others and that all others are equidistant apart.

The cylinder A with its pistons and flanges, is arranged in a casing or housing F, having standards $f$, which support it on a base plate G. This casing is open at opposite ends and is closed at top and bottom and for the most part at the sides, but has suitable openings $f'$ to permit the entrance of the rotary abutments as presently described. The inner surface of the casing is concentric at all points with the axis of the shaft B and the peripheries of the flanges $E'$, $E^2$, etc. and the pistons D, $D'$, etc. move in close steam-tight contact therewith. In order to prevent leakage from one piston compartment to the other, the flanges may be provided with suitable packing $e$, and in order to prevent leakage between the outer surface of the pistons and the inner surface of the casing, the pistons may be equipped with packing as indicated at $d$. Such packing is preferably in the shape of steel rods or strips arranged in suitable grooves in the peripheries of the pistons. As shown in Fig. 5, there is a dove-tail connection between the steel bars and the pistons so that there may be no possibility of the bars being thrown out radially or otherwise by centrifugal force. The same result may be accomplished by arranging the bars as shown in Fig. 12, where said bars are shown arranged in ordinary grooves but are made to extend partway across the adjacent flanges or rings. As these flanges bear against the inner surface of the casing F at all times, there can be no danger of their being thrown out by centrifugal force when the pistons are passing the recessed abutments.

On opposite sides of the driving-shaft B are mounted shafts H, $H'$, carrying the rotary abutments I, $I'$, $I^2$, $I^3$, $I^4$, $I^5$, $I^6$. The abutments are all of the same diameter as the cylinder A and are all of the same general shape, but the abutment I is of twice the width and twice the weight of each of the others. The three abutments I, $I'$, $I^2$, are carried by one shaft $H'$, while the other four abutments are carried by the shaft H. Each abutment is of the shape shown in perspective in Figs. 10 and 11 and in vertical section in Fig. 4, having a general cylindrical form but being provided on one side with a recess $i$ to accommodate its companion piston as the latter passes it. Each abutment is adapted to operate between two of the rings $E'$, $E^2$, etc. on the cylinder A. By reference to Fig. 4, it will be observed that when a piston passes an abutment, the recess in the abutment coincides with the piston but when the piston leaves the abutment, the periphery of the abutment bears against the periphery of the cylinder A and makes steam-tight contact therewith. (See Fig. 7). In order to insure such contact the periphery of the cylinder A is preferably covered with vulcanized rubber A' which may be applied in any suitable way. In Fig. 4 this covering is indicated, its ends being attached, as shown at $x$, but of course other suitable material may be used and it may be attached to the cylinder in other ways.

Each rotary abutment carries in its recess a shoe J which bears at the proper time against the periphery of the corresponding piston and enables the piston to pass through the recess $i$ without steam leakage. The shoe J is so connected with the abutment as indicated in Fig. 4, that it will automatically adjust itself to the periphery of the piston and thus compensate for unequal wear.

The abutments are partially inclosed by housings K, projecting laterally from the casing F and to which are secured housings L, L', L², which completely inclose the abutments. These housings are provided with partitions $l$, against which the sides of the abutments bear and make a close fit so as to avoid steam leakage. Preferably metallic packing, such as iron rods or bars, indicated at $l'$, may be arranged in grooves in the edges of the abutments to prevent such leakage. This packing may be arranged to properly bear against the sides of the housings L, L', L² and the partitions $l$.

The housing L incloses the abutments I, I', I²; the housing L', the abutments I³, I⁴, and the housing L², the abutments I⁵, I⁶. Each of these housings is detachably connected with the stationary housing K and the shafts H, H' are mounted in detachable bearings M, so that the shafts H, H', and the abutments carried thereby, may be conveniently moved bodily from the engine and readily replaced therein.

As indicated in Figs. 4 and 7, at top and bottom of each opening $f'$, there is a flange F², armed with packing rods $f^2$, against which the abutments bear as they rotate, making steam-tight connection and in rear of these flanges there is a steam space F³ in each compartment of the abutment housing. It will be understood that in the operation of the engine, steam enters the space F³, and also passes out therefrom at each operation, but such steam pressure will always be maintained on the outer side of the abutment as to counterbalance the steam pressure on the inner side thereof and thus such a balancing effect will be produced on the abutments as to relieve the parts from unequal strain and unequal wear.

The shafts B, H and H' are geared to rotate simultaneously at precisely the same speed by means of spur-wheels N at opposite ends of the engine, as we deem it important to employ duplicate sets of gearing in order to insure coincident and equal rotation of the shafts. It is essential to produce the best results. The shaft B is supported near its opposite ends by means of cross-bars O, which have yokes $o$, extending between collars P, on the shafts H, H'; yokes $o'$, extending between collars P' on the shaft B and caps $o^2$ secured to the yokes $o'$ in which the shaft B turns. The several collars are held in place on the shafts by set screws $p$. The bars O may be attached to the ends of the cylinder F by means of bolts P². By merely withdrawing the bolts P² and by detaching the caps $o^2$, the bars O may be lifted and thus separated from the shafts B, H and H'. The shaft B, with its cylinder, flanges and pistons, may then be moved endwise out of its casing. It will be observed that the casing has no end walls or heads, the end flanges E', E⁸ serving to close the ends of the cylinder and these are removable with the cylinder. In this way friction between the ends of the rotary cylinder and any cylinder heads is entirely avoided.

The steam may be admitted to and exhausted from the engine in any suitable way, but we prefer to do it in the manner indicated particularly in Fig. 7, where we have shown a valve for so controlling the admission and exhaust that the engine may be very easily reversed when desired. Q indicates a pipe for connection with the boiler and Q' indicates an exhaust pipe. These pipes are connected with a valve casing Q³, containing a rotary or oscillating valve Q⁴, controlled by a lever or handle Q⁵. The pipes Q and Q' are preferably arranged on diametrically opposite sides of the valve casing and from this casing projects pipes R, R', each of which is preferably arranged to enter the casing midway between the pipes Q, Q'. The pipes R, R' are connected with steam chests S, S', S², S³, formed on or secured to the casing F. The steam chests S, S² are used in connection with the pistons D³, D', D², D⁶, while the steam chests S', S³ are used in connection with the pistons D, D⁴, D⁵. Each one of these steam chests may be used for the admission or for the exhaust of steam, depending for such use on the position of the valve Q⁴. As shown in Fig. 7, the valve Q⁴ is set to cause live steam to be admitted to the steam chests S, and S³, while the exhaust is through the steam chests S' and S². When the valve is shifted to the position shown in Fig. 8, admission will be through the steam chests S' and S², and exhaust through the steam chests S and S³, and when the valve is moved to the position shown in Fig. 9, the admission of steam from the boiler to the valve chest will be entirely shut off. There are separate ports Z, Z', connecting the steam chests with the steam chambers between the flanges E', E², etc. Each port Z or Z', is preferably made of the same width as the piston with which it coöperates, which is therefore the same width as the distance between the two adjacent flanges E', E², etc. This is indicated in Fig. 6 and these ports, it will be observed, are arranged to allow steam to impinge on the ends of the pistons and thus the steam is caused to exert a certain force by its impact, as well as by its expansion.

Referring to Fig. 4, assuming that the valve Q⁴ is in the position shown in Fig. 7, steam is being admitted to the steam chests S and S³. When the piston D is in the position shown in Fig. 4, steam is not admitted through the port Z' and the exhaust port Z is at this time closed, but it will be understood that at this time steam is being admitted and acting upon pistons on the diametrically opposite sides of the cylinder A and thus dead centers are avoided and the steam pressure on said pistons as well as the momentum of the piston D carries said piston D to the position indicated in Fig. 7, when the port Z' is opened and steam is admitted. At this time the rotary abutment I will have moved to the position shown in Fig. 7 and the steam will collect in the space between the abutment and the piston D. The abutment in effect presents a stationary or immovable wall against which steam exerts its pressure and this pressure re-acts on the adjacent end of the piston D and causes it to rotate. This operation is well understood by those familiar with this class of engines. Steam will continue to enter through the port Z' until the piston D has again reached the position shown in Fig. 4, or substantially that position, when the entrance of steam will be stopped and soon after this the head of the piston will uncover the exhaust port S' and the steam previously admitted will be exhausted through the pipe R'. A similar operation occurs in the several divisions of the engine and the several parts of the mechanism act harmoniously to effect the desired operations without unequal wear, unequal strains or unequal pressure, as has heretofore been explained.

We claim as our invention:

1. A rotary engine comprising a piston-carrying cylinder, a plurality of pistons projecting from one side thereof, a plurality of pistons of equal size, shape and weight projecting from the diametrically opposite side thereof, continuously rotating abutments coöperating with the pistons, gearing connecting the piston-carrying cylinder and the rotary abutments, and means for simultaneously admitting steam to pistons on opposite sides of the axis of the piston-carrying cylinder, the organization being such that perfect gravity or centrifugal balance and steam balance is produced while dead centers are avoided.

2. A rotary engine comprising a main shaft, a cylinder mounted thereon and provided on its periphery with a series of spaced flanges or rings of uniform diameter, a casing surrounding said flanges, pistons carried on opposite sides of the piston-carrying cylinder between the flanges and arranged to effect gravity and centrifugal balance, continuously rotating recessed abutments on opposite sides of said piston-carrying cylinder and coöperating with the pistons, and gearing connecting the rotary abutments with the piston-carrying cylinder.

3. A rotary engine comprising a shaft, a series of pistons on one side of the shaft, a series of pistons on the diametrically opposite side thereof, equal in size, shape and weight to those first mentioned, recessed rotary abutments on one side of the shaft coöperating with pistons on both sides thereof, rotary abutments on the opposite side of the piston-carrying shaft also coöperating with pistons on both sides of the shaft, and means for admitting the motive fluid to some of the pistons on one side of the shaft and simultaneously to some of the pistons on the opposite side thereof, the organization being such that perfect steam balance and centrifugal or gravity balance is obtained and dead centers are avoided.

4. A rotary engine comprising a piston-carrying-cylinder provided with a series of spaced rings or flanges on its periphery, a casing surrounding said flanges and which is open at opposite ends to permit the withdrawal endwise of the piston-carrying-cylinder with its flanges, rotary abutments coöperating with the pistons and detachable housings in which said abutments are mounted.

5. A rotary engine comprising a piston-carrying-cylinder provided with spaced flanges on its periphery, pistons arranged between said flanges, a casing within which said piston-carrying-cylinder rotates, recessed rotary abutments on opposite sides of the piston-carrying-cylinder, housings for said rotary abutments having counterbalancing steam pressure spaces, and gearing connecting the rotary abutments with the piston-carrying-cylinder to cause them to rotate therewith at the same speed.

6. A rotary engine comprising a piston-carrying-cylinder provided with spaced flanges on its periphery between which the pistons are arranged, a casing surrounding said flanges and open at opposite ends to permit the withdrawal endwise of the piston-carrying-cylinder and to prevent friction at the ends or heads of the cylinders, rotary abutments on opposite sides of the piston-carrying-cylinder and coöperating therewith, detachable housing sections for the said abutments and detachable bearings for the abutments whereby the abutments may be readily removed from the engine.

7. A rotary engine comprising a piston-carrying-cylinder provided with spaced flanges on its periphery, pistons carried by the cylinder between said flanges, a casing in which the piston-carrying-cylinder is arranged and which is provided with steam chests for admission and exhaust and which is connected with the piston-carrying-cylinder by ports of equal area with the pistons and which ports deliver the motive fluid tangentially with reference to the cylinder, a reversing valve for governing the admission and exhaust of the motive fluid, and rotary abutments coöperating with the piston-carrying-cylinder.

8. A rotary engine comprising a piston-carrying-cylinder provided with spaced rings or flanges on its periphery a comparatively large piston on one side of its axis, two other pistons of half the size on opposite sides of said first-mentioned piston but on the same side of the axis of the cylinder; four other pistons of half the size of the first-mentioned piston arranged on the diametrically opposite side of the axis of the piston-carrying-cylinder, rotary abutments coöperating with the pistons, gearing connecting the abutments with the piston-carrying-cylinder, and means for controlling the admission and exhaust of the motive fluid.

9. A rotary engine comprising a piston-carrying-cylinder, provided with spaced flanges on its periphery, pistons arranged between the flanges, recessed rotary abutments coöperating with the pistons and self-adjusting shoes carried by the abutments within the recesses which bear upon the peripheries of the pistons.

10. A rotary engine comprising a piston-carrying-cylinder provided with spaced flanges on its periphery, pistons arranged between the flanges and having steel packing-bars on their peripheries, recessed rotary abutments coöperating with the pistons, self-adjusting shoes in the recesses of the abutments which bear on the peripheries of the pistons, housings for the abutments having packed steam-tight surfaces in contact with which the peripheries of the abutments move, and packing in the sides of the abutments to afford steam-tight connection with the sides of the abutment housings.

11. A rotary engine comprising a main shaft, a piston-carrying-cylinder thereon, provided with spaced flanges on its periphery, pistons arranged between said flanges, rotary abutments on opposite sides of the piston-carrying-cylinder, the shafts to which they are connected, gearing at opposite ends of the main shaft and the rotary abutment shafts for causing all such shafts to rotate simultaneously at the same speed, collars on said shafts, and the yoked end bars for connecting said shafts, for the purpose specified.

In testimony whereof, we have hereunto subscribed our names.

BYRON B. BOWER, Sr.
GEORGE GORDON BOWER.

Witnesses:
Jno. E. Donalson,
J. W. Butts.